United States Patent
Ishii

(10) Patent No.: US 10,212,316 B2
(45) Date of Patent: Feb. 19, 2019

(54) VIDEO PROCESSING APPARATUS

(71) Applicant: CANON KABUSHIKI KAISHA, Tokyo (JP)

(72) Inventor: Atsushi Ishii, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 241 days.

(21) Appl. No.: 14/566,876

(22) Filed: Dec. 11, 2014

(65) Prior Publication Data

US 2015/0189127 A1   Jul. 2, 2015

(30) Foreign Application Priority Data

Dec. 27, 2013   (JP) ................. 2013-271794

(51) Int. Cl.
| | |
|---|---|
| *H04N 5/04* | (2006.01) |
| *G09G 5/397* | (2006.01) |
| *H04N 21/44* | (2011.01) |
| *H04N 21/43* | (2011.01) |
| *H04N 5/45* | (2011.01) |
| *G09G 5/00* | (2006.01) |
| *G09G 5/18* | (2006.01) |

(52) U.S. Cl.
CPC ............ *H04N 5/04* (2013.01); *G09G 5/397* (2013.01); *H04N 21/4302* (2013.01); *H04N 21/44004* (2013.01); *G09G 5/001* (2013.01); *G09G 5/18* (2013.01); *H04N 5/45* (2013.01)

(58) Field of Classification Search
None
See application file for complete search history.

(56) References Cited

U.S. PATENT DOCUMENTS

| | | | | |
|---|---|---|---|---|
| 4,862,269 A | * | 8/1989 | Sonoda ................. | G09G 5/399 348/514 |
| 5,914,757 A | * | 6/1999 | Dean ..................... | H04N 5/073 348/537 |
| 7,106,384 B1 | | 9/2006 | Scheffler | |
| 7,336,317 B2 | | 2/2008 | Yui et al. | |

FOREIGN PATENT DOCUMENTS

| | | | |
|---|---|---|---|
| JP | S6446375 A | | 2/1989 |
| JP | 05083686 A | | 4/1993 |
| JP | 2000513169 A | | 10/2000 |
| JP | 2002537571 A | | 11/2002 |
| JP | 2004295133 A | | 10/2004 |
| JP | 2005124167 A | | 5/2005 |
| JP | 2006267663 A | | 10/2006 |
| JP | 2007271848 A | | 10/2007 |
| JP | 2010119026 A | | 5/2010 |
| JP | 2012118563 A | * | 6/2012 |

OTHER PUBLICATIONS

Office Action issued in Japanese Appln. No. 2013-271794 dated Dec. 5, 2017.

* cited by examiner

*Primary Examiner* — Samira Monshi
(74) *Attorney, Agent, or Firm* — Rossi, Kimms & McDowell LLP

(57) ABSTRACT

A video processing apparatus includes a memory configured to store a plurality of video signals, a combining unit configured to combine the video signals to output a combined video signal, a synchronizing unit configured to synchronize one of the video signals and the combined video signal, and a control unit configured to control an output timing of the combined video signal based on states of the other video signals.

10 Claims, 5 Drawing Sheets

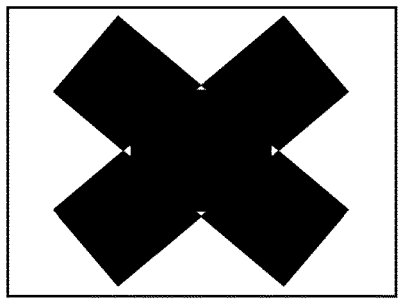
FIG. 7A
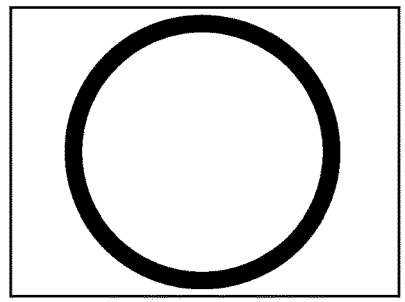
FIG. 7B
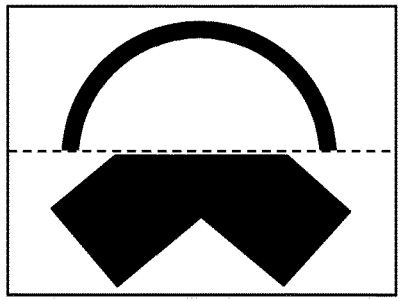
FIG. 7C
FIG. 8A
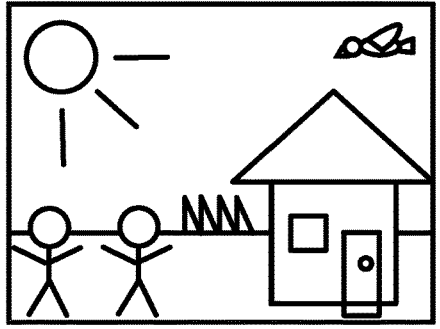
FIG. 8B
FIG. 8C
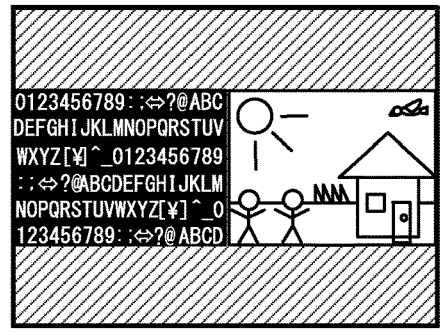
FIG. 8D

VIDEO PROCESSING APPARATUS

BACKGROUND OF THE INVENTION

Field of the Invention

The present invention relates to a video processing apparatus, and more particularly relates to a video processing apparatus configured to combine and output a plurality of video signals.

Description of the Related Art

A conventional video processing apparatus temporarily stores an input video signal in a frame memory before outputting or displaying the video signal. When such a video processing apparatus reads the video signal from the frame memory irrespective of a frame frequency of the input video signal, an overtaking is generated in some cases between the input video signal and an output video signal, so that information (video signals) of different frames exists in one frame. Any large difference between the video signals of the different frames generates a horizontal line on a video image, which is called a tearing and degrades viewing.

A technology called frame lock prevents generation of such a tearing by reading out a video signal in synchronization with the frame frequency of the input video signal so as to appropriately adjust their phases.

Japanese Patent Laid-open No. 2007-271848 discloses a method of selecting, in a video output apparatus that generates a single display video from a plurality of input video signals and outputs the display video, a frame frequency of the display video from among those of the input video signals by a predetermined selection rule. Japanese Patent Laid-open No. 5-83686 discloses a video signal input/output apparatus that outputs a video signal converted to have a period different from that of an input video signal.

However, a method disclosed in Japanese Patent Laid-open No. 2007-271848 prompts a user to select a synchronization target video signal, and thus expects the user a relevant knowledge, which is a burden on the user. Japanese Patent Laid-open No. 2007-271848 discloses a method of prioritizing a video signal having a larger displayed area and setting it as a synchronization target, but this selection rule is not necessarily correlated with a generation of a tearing. Such a generation of a tearing makes a degradation of viewing unavoidable in some cases. Japanese Patent Laid-open No. 2007-271848 discloses a method of setting an input video having a largest content change between frames as the synchronization target, but this method requires the synchronization target to be selected after the change occurs, potentially showing, for example, a tearing to the user. In addition, measurement of the change requires a large processing load.

The configuration disclosed in Japanese Patent Laid-open No. 5-83686 does not support a combination of a plurality of input signals, and also cannot avoid generations of skipping and double reading of frames of the input video.

Another practically used technology employs a plurality of frame memories to prevent a tearing by appropriately controlling timings of writing to and read from each frame memory. However, such a configuration with a plurality of frame memories leads to a high cost.

SUMMARY OF THE INVENTION

The present invention provides a video processing apparatus that reduces generation of a tearing using a few frame memories when combining a plurality of input video signals and outputting a combined signal, and a method of controlling the video processing apparatus.

A video processing apparatus as one aspect of the present invention includes a memory configured to store a plurality of video signals, a combining unit configured to combine the video signals to output a combined video signal, a synchronizing unit configured to synchronize one of the video signals and the combined video signal, and a control unit configured to control an output timing of the combined video signal based on states of the other video signals.

A display device as another aspect of the present invention includes the video processing apparatus.

A method of controlling a video processing apparatus as another aspect of the present invention includes the steps of storing a plurality of video signals in a memory, synchronizing one of the video signals and a combined video signal obtained by combining the video signals, controlling an output timing of the combined video signal based on states of the other video signals, and outputting the combined video signal.

A non-transitory computer-readable storage medium as another aspect of the present invention stores a program that causes a computer to perform a process to control a video processing apparatus, and the process includes the steps of storing a plurality of video signals in a memory, synchronizing one of the video signals and a combined video signal obtained by combining the video signals, controlling an output timing of the combined video signal based on states of the other video signals, and outputting the combined video signal.

Further features and aspects of the present invention will become apparent from the following description of exemplary embodiments with reference to the attached drawings.

BRIEF DESCRIPTION OF THE DRAWINGS

FIGS. 7A to 7C are explanatory diagrams of tearing.

FIGS. 8A to 8D illustrate combination of a plurality of video signals.

DESCRIPTION OF THE EMBODIMENTS

Exemplary embodiments of the present invention will be described below with reference to the accompanied drawings.

First, referring to FIGS. 7A to 7C, a "tearing" in an embodiment of the present invention will be described. FIGS. 7A to 7C are explanatory diagrams of the tearing. FIG. 7A represents a frame of an input video signal, and FIG. 7B represents a frame of a video signal input following the video signal illustrated in FIG. 7A. FIG. 7C illustrates a video image read from a frame memory in writing of a video image illustrated in FIG. 7B to the frame memory, the video image in FIG. 7B being illustrated above a broken centerline and the video image of the previous frame in FIG. 7A being illustrated below the centerline. In this manner, reading of information of temporally sequential frames generates a boundary between images of the frames different from each other as illustrated with the broken line in FIG. 7C, which is called a tearing.

Next, referring to FIGS. 8A to 8D, a "combination of a plurality of video signals" in the present embodiment will be described. FIGS. 8A to 8D illustrate the combination of the video signals. FIGS. 8A and 8B illustrate the video signals to be combined, and FIGS. 8C and 8D respectively illustrate video images output or displayed after the video signals illustrated in FIGS. 8A and 8B are combined.

FIG. 8C illustrates a video image combined by a side-by-side method. The combined video image in FIG. 8C is output or displayed showing the video signals in FIGS. 8A and 8B side by side. FIG. 8D illustrates a video image combined by a picture-in-picture method. The video image in FIG. 8D displays an inset picture of the video image in FIG. 8B. Such combination of a plurality of video signals allows, for example, a TV program to be displayed as an inset picture on a working screen of a personal computer, thus achieving improved convenience. The present embodiment as a method of combining a plurality of video signals is not limited to those methods, and may employ other methods of combining the video signals through combination of the arrangement, size, and number of various kinds of video images.

Figure 1:
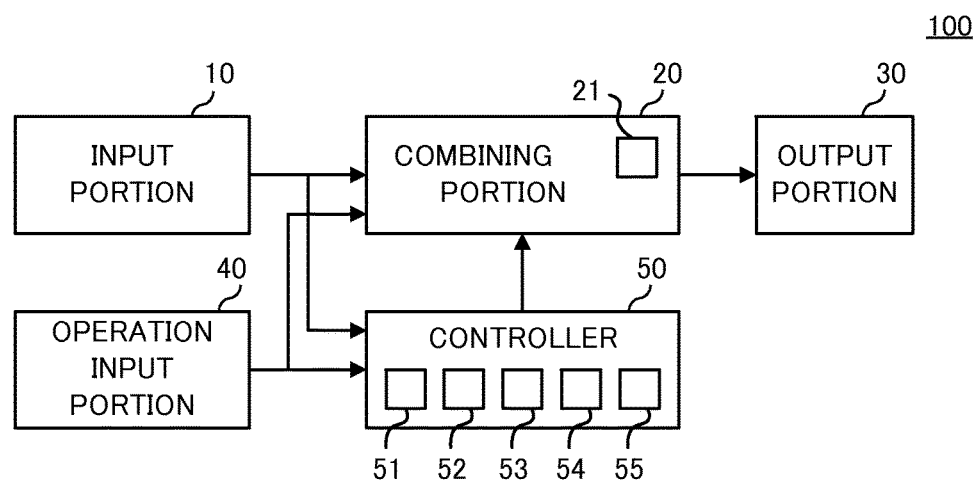
FIG. 1 is a block diagram of a video processing apparatus according to an embodiment of the present invention.

Next, referring to FIG. 1, a schematic configuration of a video processing apparatus in the present embodiment will be described. FIG. 1 is a block diagram of a video processing apparatus 100. The video processing apparatus 100 is, but not limited to, a video output apparatus or a display device, and may be any apparatus that performs video image processing.

The video processing apparatus 100 includes an input portion 10, a combining portion 20, an output portion 30, an operation input portion 40, and a controller 50. The input portion 10 (input unit) receives a plurality of video signals from an external apparatus (not illustrated). The input portion 10 includes a plurality of terminals, such as a composite terminal and an HDMI (registered trademark) terminal, through which the video signals are input, and is capable of receiving the video signals in various formats (forms). As described later, the video signals input through the input portion 10 are combined by the combining portion 20 (combining unit) and are output in a predetermined format (form) from the output portion 30.

The combining portion 20 combines the video signals based on an operation input signal corresponding to a combination configuration input by a user through the operation input portion 40, and outputs a combined video signal. The combining portion 20 is preferably configured to determine whether the combination is effective based on the operation input signal from the operation input portion 40, and to combine the video signals when the combination is effective. In the present embodiment, the user uses the operation input portion 40 to select a display method such as the picture-in-picture method and the side-by-side method and to select a combination of the video signals to be displayed. The combining portion 20 performs combination in accordance with the selection. The combining portion 20 includes a frame memory 21 (memory) that temporarily stores the video signals obtained through the input portion 10. The frame memory 21 is capable of storing an image having a resolution of a video image (the video signals) output from the output portion 30. In other words, the frame memory 21 is configured to store an output video signal constituted by a plurality of input video signals for one frame. The combining portion 20 performs signal processing such as resolution conversion on each input video signal, and then writes the video signal to the frame memory 21.

The output portion 30 outputs a video signal (the combined video signal) including a synchronizing signal and a clock signal in a predetermined signal format (configuration of dot clock, horizontal synchronizing frequency, and blanking period). In the present embodiment, a vertical synchronizing signal included in the video signal output from the output portion 30 is a signal output from the combining portion 20. The vertical synchronizing signal is controlled by the controller 50 described later and has its period synchronized with that of a synchronization target video signal (input video signals that is targeted for frame lock). The vertical synchronizing signal also has its minute timing (phase) adjusted by the controller 50. The video signal output from the output portion 30 is generated by sequentially reading information (video signal) stored in the frame memory 21 of the combining portion 20 after a predetermined blanking period based on the vertical synchronizing signal has past.

The controller 50 includes a synchronizing unit 51, an adjusting unit 52, a predicting unit 53, a calculating unit 54, and a control unit 55. The synchronizing unit 51 synchronizes the vertical synchronizing signal output from the combining portion 20 to the output portion 30 with the synchronization target video signal based on an input vertical synchronizing signal of the synchronization target video signal. In this manner, the synchronizing unit 51 synchronizes one of the video signals and the combined video signal (the periods thereof). In the present embodiment, the synchronization target video signal is selected in accordance with a predetermined rule by the controller 50 based on the configuration set by the user through the operation input portion 40.

The adjusting unit 52 adjusts a timing (output timing) of the vertical synchronizing signal output from the combining portion 20 to the output portion 30 within a range corresponding to one period of a vertical synchronizing frequency of the synchronization target video signal (within a range in which no double-reading and skipping of frames of a synchronization target video image is generated). In the present embodiment, an adjustment amount of the timing is controlled by the controller 50 described later. In this manner, the synchronization and adjustment control by the synchronizing unit 51 and the adjusting unit 52 allows a video image outputting of the video processing apparatus 100 in the present embodiment to be performed with its period being synchronized with the period of the vertical synchronizing signal of the synchronization target video signal and with its phase being varied in a shorter period through a phase adjustment.

The predicting unit 53 predicts occurrence of an overtaking (predicts whether the overtaking occurs) in reading of the video signal (output signal, combined signal) from the combining portion 20. In the present embodiment, the predicting unit 53 performs this prediction based on the signal format of the video signal input through the input portion 10, the combination configuration by the combining portion 20, and the signal format of the video signal output from the output portion 30. In the present embodiment, the predicting unit 53 preferably predicts, at each completion of reading of the video signals for one frame from the frame memory 21, generation of an overtaking in the next reading. The accuracy of the input video signal, which depends on the external apparatus that outputs the video signal, is not necessarily constant. The present embodiment performs periodic measurement to deal with this inconstancy.

The calculating unit 54 calculates a priority of each of a plurality of video signals input through the input portion 10. The priority is calculated based on, for example, a size of a display region of a video image combined by the combining portion 20 or a similarity index of signal formats of the video signal and the synchronization target video signal. At each completion of writing of the synchronization target video signal to the frame memory 21, the control unit 55 adjusts (controls) the output timing of the vertical synchronizing signal from the combining portion 20, as necessary, based on an overtaking prediction result by the predicting unit 53. In other words, the control unit 55 controls the output timing of the combined video signal based on states of the other video signals. This is described later in detail.

Figure 2:
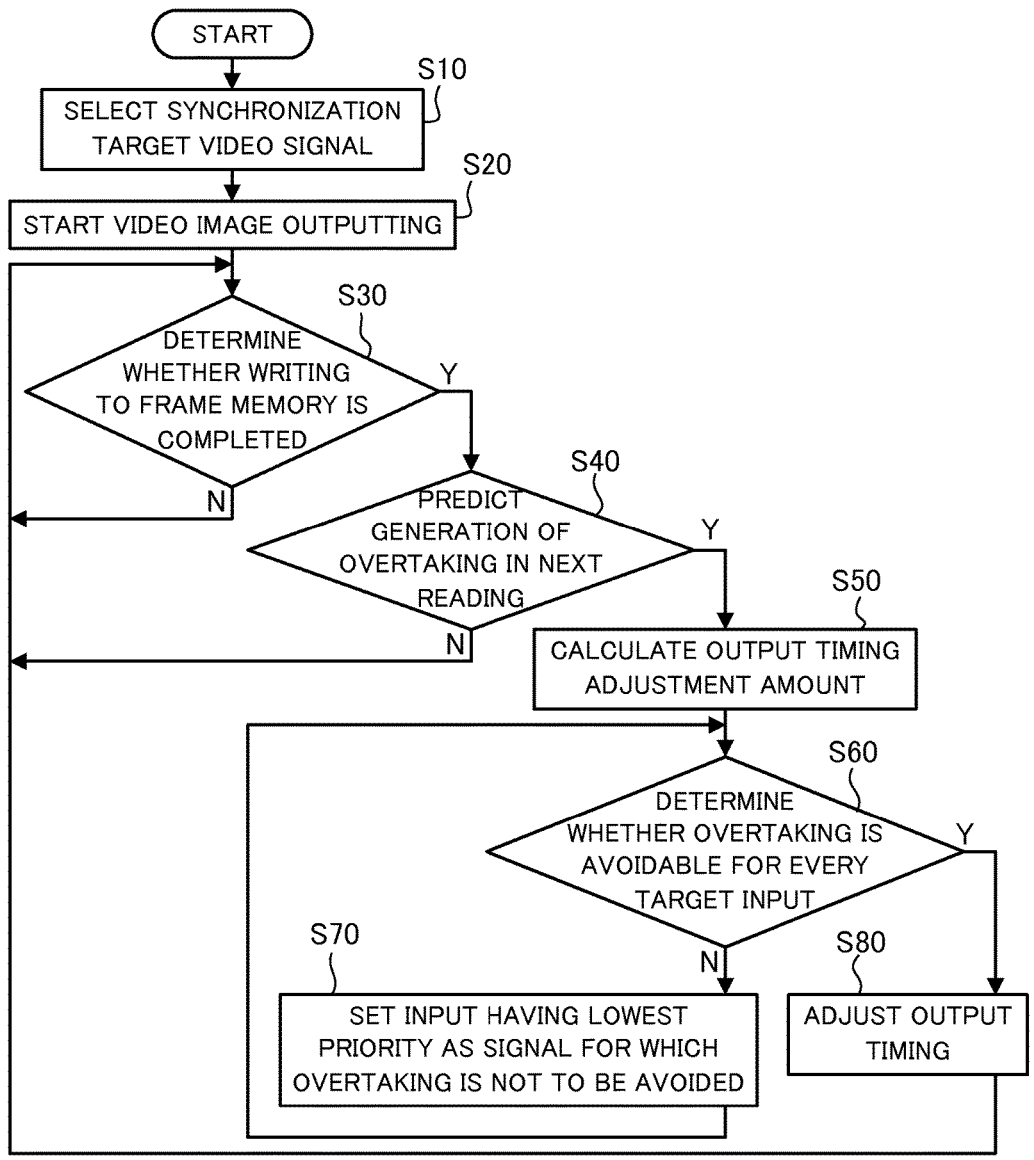
FIG. 2 is a flowchart of a method of controlling the video processing apparatus (method of adjusting an output timing of a video signal) in the embodiment.

Next, referring to FIG. 2, a method of controlling the output timing of the video signal from the combining portion 20 to the output portion 30 (a method of controlling the video processing apparatus 100) will be described. FIG. 2 is a flowchart illustrating a method of controlling the video processing apparatus 100. Each step in FIG. 2 is executed by the controller 50 in accordance with a program (video image processing program) stored in the video processing apparatus 100. It is assumed that, when the steps in FIG. 2 start, the combination configuration of the video signal is already performed by the operation input portion 40.

First at step S10, the controller 50 (synchronizing unit 51) selects a synchronization target video signal from among a plurality of video signals input from the input portion 10. Subsequently at step S20, the controller 50 starts outputting (video image outputting) of a vertical synchronizing signal from the combining portion 20 to the output portion 30. When the video image outputting starts, the video signals from the input portion 10 are previously transmitted to the combining portion 20 and already combined therein.

Subsequently at step S30, the controller 50 determines whether writing of the synchronization target video signal to the frame memory 21 is completed. For example, the controller 50 performs the determination by repeating check by polling. When the writing to the frame memory 21 is completed, the flow proceeds to step S40.

At step S40, the controller 50 (predicting unit 53) predicts generation of an overtaking in reading of a next video signal from the frame memory 21 to the output portion 30. When the predicting unit 53 predicts no generation of an overtaking of the video signal, the process returns to step S30 and waits for a next writing to the frame memory 21. On the other hand, when the predicting unit 53 predicts generation of an overtaking of the video signal, the flow proceeds to step S50.

At step S50, the controller 50 (adjusting unit 52) adjusts an output timing of the vertical synchronizing signal from the combining portion 20 to the output portion 30. For example, the controller 50 (adjusting unit 52) calculates an adjustment amount (output timing adjustment amount) needed to avoid the overtaking for every target input (video signal) for which the overtaking is to be avoided.

Subsequently at step S60, the controller 50 determines, for every target input (video signal), whether the overtaking is avoidable within a range of each adjustment amount calculated at step S50. When the overtaking is unavoidable for every target video signal, the flow proceeds to step S70.

On the other hand, when the overtaking is avoidable for every target video signal, the flow proceeds to step S80.

At step S70, the controller 50 (calculating unit 54) calculates a priority of each input (video signal) and sets an input (video signal) having a lowest priority as a signal for which an overtaking is not to be avoided, and then the process returns to step S60. In this manner, in the present embodiment, the number of target video signals for which the overtaking is to be avoided is reduced so as to avoid the overtaking of as many video signals as possible. Thus, all inputs (video signals) except for the synchronization target video signal may be set as inputs for which the overtaking is not to be avoided in some cases. For example, when an input video signal has a period for writing to the frame memory 21 twice as that of the synchronization target video signal, the generation of the overtaking is unavoidable in a frame corresponding to this video signal.

At step S80, the controller 50 (control unit 55) adjusts (controls) the output timing based on the adjustment amount calculated by the adjusting unit 52 at step S50, and the process returns to step S30.

Figure 3:
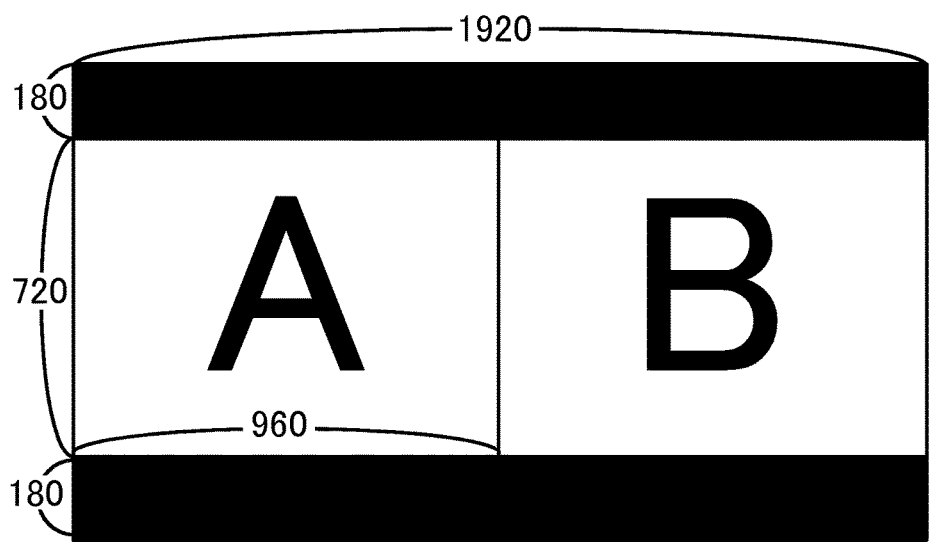
FIG. 3 illustrates an exemplary video signal output from the video processing apparatus in the embodiment.

Next, referring to FIG. 3, the adjustment of the output timing of the video image (video signal) performed at the controller 50 will be described. FIG. 3 illustrates an example of the video signal output from the video processing apparatus 100 in the present embodiment. FIG. 3 illustrates an output signal that is combined side-by-side by the combining portion 20 from two input signals (video signals) input through the input portion 10 and is output from the output portion 30. The two input signals are respectively referred to as an input signal 1 and an input signal 2, the input signal 1 being displayed on a region labeled with "A" displayed on left in FIG. 3, and the input signal 2 being displayed on a region labeled with "B" displayed on right in FIG. 3. The input signals are what are called SD signals having dot clocks different from each other: a vertical synchronizing frequency of the input signal is 60.00 Hz, and a vertical synchronizing frequency of the input signal 2 is 59.94 Hz.

Other signal formats of each input signal are HPixels=720 dots, VLines=480 lines, HTotal=858 dots, VTotal=525 lines, and VDataStart=37 line. In this example, each input signal is provided with a resolution conversion to the size of 960×720 through combination, and the input signal 1 is set as a synchronization target.

On the other hand, the output signal is what is called a HD signal and has a vertical synchronizing frequency of 60.00 Hz in accordance with the input signal 1 as the synchronization target. Other signal formats of the output signal are HPixels=1920 dots, VPixels=1080 lines, HTotal=2200 dots, VDataStart=40 line, and PixelClock=148.5 MHz. That is, when the vertical synchronizing frequency is 60.00 Hz, VTotal is 1125 lines.

Figure 4:
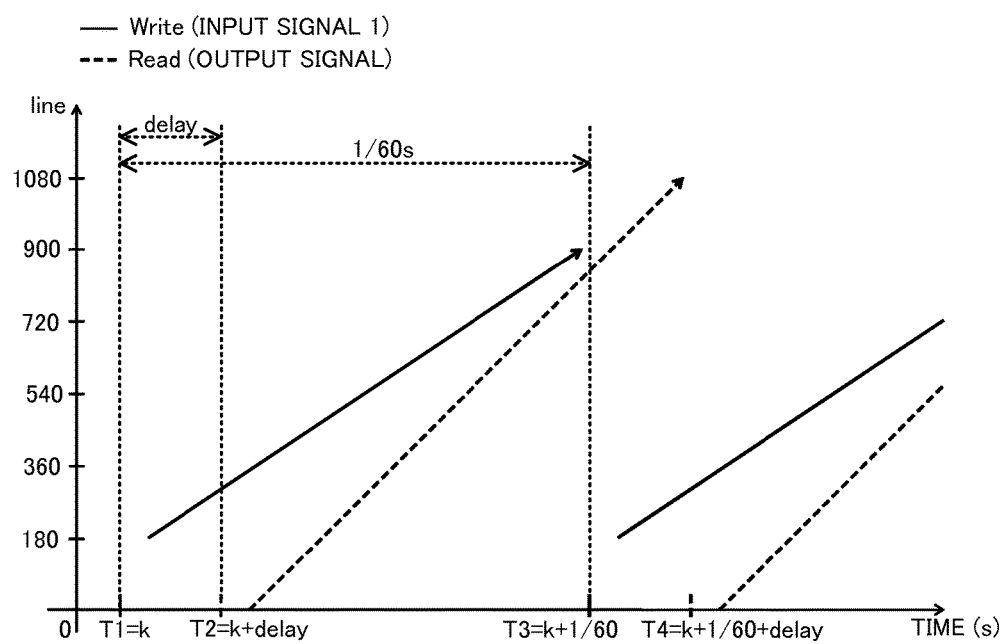
FIG. 4 illustrates a relation between writing of an input signal 1 to a frame memory and reading of an output signal from the frame memory in the embodiment.

Next, referring to FIGS. 4 to 6, a relation between the input signals (input video signals) and the output signal (output video signal) will be described. FIG. 4 illustrates a relation between writing of the input signal 1 and reading of the output signal in the frame memory 21 of the combining portion 20. In FIG. 4, a vertical axis (Y axis) represents the number of lines in the frame memory 21, and a horizontal axis (X axis) represents time. In FIG. 4, an arrow of a solid line represents writing of the input signal 1 to the frame memory 21, and an arrow of a broken line represents reading of the output signal from the frame memory 21. A vertical line on the horizontal axis (X axis) represents a timing of the vertical synchronizing signal of each of the input signal 1 and the output signal.

Time T1=k in FIG. 4 represents a time (timing) when the vertical synchronizing signal of the input signal 1 is input to the input portion 10 of the video processing apparatus 100 in the present embodiment. After a time duration corresponding to the VDataStart of the input signal 1 has passed from time T1, the input signal 1 is provided with a resolution conversion to be sequentially written to 180-th to 900-th lines of the frame memory.

Time T2=k+delay in FIG. 4 represents a time when the vertical synchronizing signal of the output signal from the combining portion 20 is output. After a time duration corresponding to the VDataStart of the output signal has passed from time T2, the output signal is sequentially read by the output portion 30 from zeroth line to 1080-th line of the frame memory 21.

Time T3=k+1/60 and time T4=k+1/60+delay in FIG. 4 respectively represent times (timings) of next vertical synchronizing signals of times T1 and T2. The value "delay" is the adjustment amount set by the controller 50 (adjusting unit 52). The adjustment amount "delay" is calculated based on formats of each signal so as to prevent video signal reading from overtaking video signal writing. Specifically, the adjustment amount "delay" at time T2 is adjusted within such a range that a broken line corresponding to time T2 does not intersect with solid lines respectively corresponding to times T1 and T3. Although FIG. 4 illustrates that the adjustment amount "delay" at time T4 is the same as the adjustment amount "delay" at time T2, the adjustment amount "delay" at time T4 is dynamically adjusted by the controller 50 (adjusting unit 52) within the range based on a state of the input signal 2.

Figure 5:
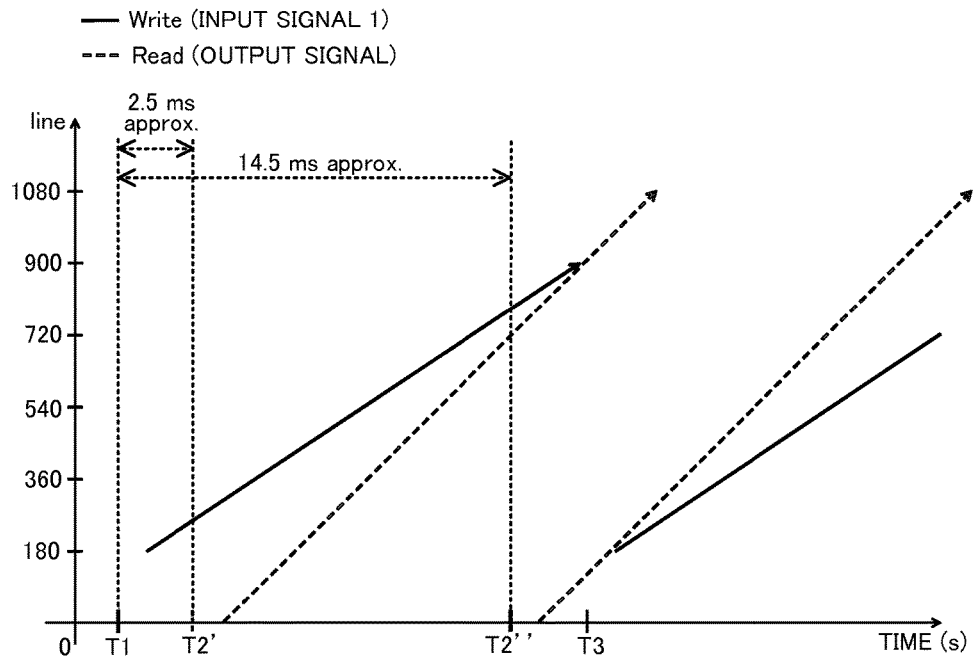
FIG. 5 illustrates an adjustable range of "delay" in the embodiment.

FIG. 5 illustrates an adjustable range of the adjustment amount "delay" in FIG. 4. In the present embodiment, as illustrated in FIG. 5, the adjustment amount "delay" is adjustable within a range of 2.5 to 14.5 ms approximately. In FIG. 5, time T2' represents time T2 at which the adjustment amount "delay" is minimum, and T2' represents time T2 at which the adjustment amount "delay" is maximum.

Figure 6:
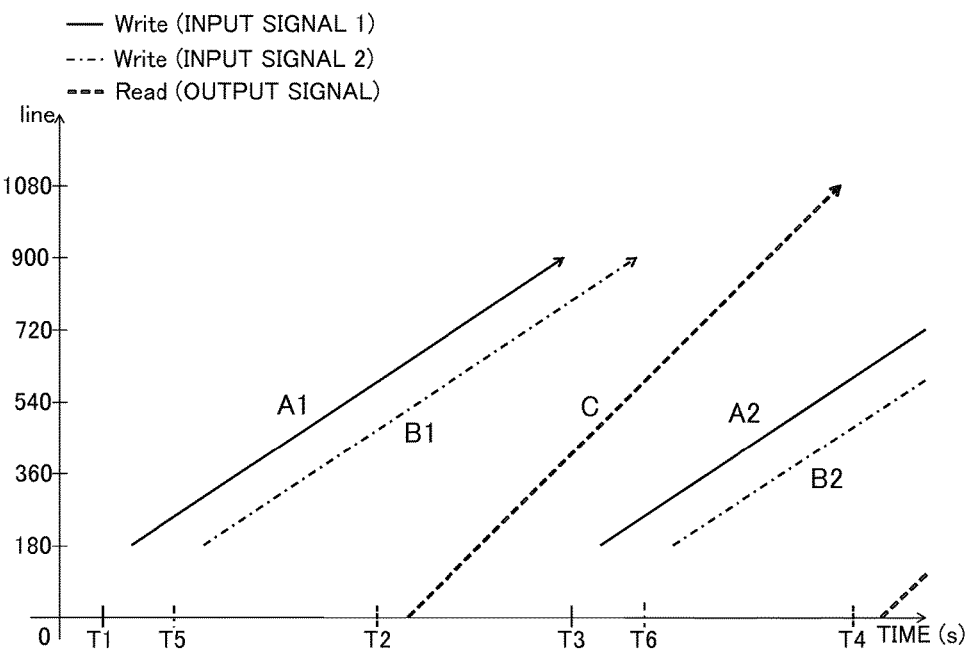
FIG. 6 illustrates a relation between writing of input signals 1 and 2 to the frame memory and reading of an output signal from the frame memory in the embodiment.

FIG. 6 illustrates a relation between writing of the input signals 1 and 2 and reading of the output signal in the frame memory 21, and is a diagram in which a writing signal of the input signal 2 is added to FIG. 4. An arrow with a dashed line in FIG. 6 represents writing of the input signal 2 to the frame memory 21, and dashed vertical lines (T5 and T6) represent timings of the vertical synchronizing signal of the input signal 2. Time T5 in FIG. 6 represents a time when the vertical synchronizing signal of the input signal 2 is input to the video processing apparatus 100 in the present embodiment, and time T6 represents a time (timing) of a vertical synchronizing signal following the vertical synchronizing signal at time T5.

As described above, since the input signal 1 has a vertical synchronizing frequency of 60.00 Hz, and the input signal 2 has a vertical synchronizing frequency of 59.94 Hz, which leads to a relation T5−T1<T6−T3, timings of writing the input signal 1 and the input signal 2 to the frame memory 21 gradually become shifted from each other. Thus, when a certain time has passed with the adjustment amount "delay" being kept constant, there occurs an overtaking (video signal overtaking) of writing of the input signal 2 to the frame memory 21 by reading of the output signal from the frame memory 21. This causes a tearing in the output signal (output video image) as described above.

In order to avoid the tearing, the controller 50 (control unit 55) performs an adjustment, for example, to selectively set the adjustment amount "delay" to one of 2.5 ms at minimum and 14.5 ms at maximum. For example, when the adjustment amount "delay" is initially set to 2.5 ms and predicted by the predicting unit 53 to generate an overtaking in reading of a next output signal from the frame memory 21, the control unit 55 sets the adjustment amount "delay" to 14.5 ms. On the other hand, when the adjustment amount "delay" is set to 14.5 ms and predicted by the predicting unit 53 to generate an overtaking in reading of the next output signal from the frame memory 21, the control unit 55 sets the adjustment amount "delay" to 2.5 ms. Such a control can prevent a tearing in the output signal (output video signal).

As described above, in the present embodiment, the control unit 55 controls the output timing of the combined video signal based on the states of the video signals. The video processing apparatus 100 preferably includes the predicting unit 53 that predicts, when outputting the combined video signal from the frame memory 21, generation of an overtaking of at least one of the video signals (another video signal). When the generation of the overtaking is predicted by the predicting unit 53, the control unit 55 adjusts the output timing of the combined video signal.

The predicting unit 53 preferably predicts the generation of the overtaking of at least one of the video signals (the other video signal) based on a relation between a timing of storing signals of two temporally different frames of each video signal and the output timing of the combined video signal.

The predicting unit 53 more preferably predicts an overtaking based on whether a timing of writing a signal of at least one of the two frames to the frame memory 21 and a timing of reading the combined video signal from the frame memory 21 intersects with each other. The intersection of the writing timing and the reading timing means that a broken line C illustrating an output signal (combined video signal) intersects with solid lines A1 and A2 illustrating input signals 1 and dashed lines B1 and B2 illustrating input signals 2 in FIG. 6. Thus, the control unit 55 preferably performs a control so as to prevent the broken line C from intersecting with the solid lines A1 and A2 and the dashed lines B1 and B2.

The video processing apparatus 100 preferably includes the adjusting unit 52 that calculates an adjustment amount for adjusting the output timing of the combined video signal when an overtaking is predicted by the predicting unit 53. Then, the control unit 55 adjusts the output timing of the combined video signal based on this adjustment amount. The adjusting unit 52 preferably calculates the adjustment amount within a range of one period of each video signal.

The video processing apparatus 100 preferably includes the calculating unit 54 that calculates priorities of the video signals. The calculating unit 54 determines, when having determined that an overtaking is unavoidable for every video signal, whether the overtaking is avoidable for video signals except for a video signal having a highest priority among the video signals. The control unit 55 more preferably controls the output timing of the combined video signal based on every target video signal when the calculating unit 54 has determined that the overtaking is avoidable for the target video signal.

The present embodiment controls, when combining a plurality of input video signals to output a combined signal, an output timing of the combined video signal based on states of the input video signals. Thus, the present embodiment provides a video processing apparatus that reduces generation of a tearing using a few frame memories when combining the input video signals and outputting the combined signal, and a method of controlling the video processing apparatus.

While the present invention has been described referring to exemplary embodiments, it is to be understood that the invention is not limited to the disclosed exemplary embodiments. The scope of the following claims is to be accorded the broadest interpretation so as to encompass all such modifications and equivalent structures and functions.

For example, the present embodiment describes the video output apparatus as the video processing apparatus, but the invention is not limited thereto. The present embodiment is applicable to display devices such as a projector, a liquid crystal display, a television, a DVD recorder, and a frame synchronizer, and a video processing apparatus included in a playback apparatus.

In the present embodiment, the process at step S30 in FIG. 2 is based on completion of writing to the frame memory 21, but is not limited thereto. The process may be based on other conditions such as timings of the vertical synchronizing signals of the input signal 1 and the output signal. In the present embodiment, the priority of a video signal is determined based on the size of the display region of the video signal, but the determination is not limited thereto. The priority may be determined based on a moving amount, resolution, and frame rate of an input signal or based on an input terminal and a display position.

In the present embodiment, the combination is performed by the side-by-side method, but is not limited thereto. The combination may be performed by other combining methods such as the picture-in-picture method and a method of combining three screens or more. In the present embodiment, the input signal 1 is set as the synchronization target video signal, but the present invention is not limited thereto. For example, the synchronization target video signal may be determined based on the priority and set.

OTHER EMBODIMENTS

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2013-271794, filed on Dec. 27, 2013, which is hereby incorporated by reference wherein in its entirety.

What is claimed is:

1. A video processing apparatus comprising:
a memory configured to store a program and a plurality of input video signals; and
a processor configured to execute the program to implement a combining unit, a synchronizing unit, a predicting unit, and a control unit, wherein:
the combining unit is configured to combine the plurality of input video signals to output a combined video signal,
the synchronizing unit is configured to synchronize the combined video signal with one of the plurality of input video signals,
the control unit is configured to control an output timing of the combined video signal based on input timings of the plurality of input video signals, and
the predicting unit is configured to predict whether an overtaking occurs based on a relation between the input timing of the plurality of input video signals and the output timing of the combined video signal,
wherein when the overtaking is unavoidable for every input video signal of the plurality of input video signals, the control unit controls the output timing of the combined video signal based on input timings of input video signals except for an input video signal having a lowest priority among the plurality of input video signals.

2. The video processing apparatus according to claim 1, wherein the predictor predicts occurrence of the overtaking based on whether a writing position on the memory for at least one of the plurality of input video signals overtakes a reading position on the memory for the combined video signal or whether the reading position overtakes the writing position.

3. The video processing apparatus according to claim 1, wherein the processor is configured to execute the program to further implement an adjusting unit, and the adjusting unit is configured to calculate an adjustment amount for adjusting the output timing of the combined video signal when the predicting unit predicts occurrence of the overtaking, wherein the control unit adjusts the output timing of the combined video signal based on the adjustment amount.

4. The video processing apparatus according to claim 3, wherein the adjusting unit calculates the adjustment amount within a range of one period of a vertical synchronizing frequency of a video signal synchronized with the combined video signal among the video signals.

5. The video processing apparatus according to claim 1, wherein when the overtaking is avoidable for every input video signal of the plurality of input video signals, the control unit controls the output timing of the combined video signal based on the input timings of the plurality of input video signals.

6. The video processing apparatus according to claim 1, wherein the memory includes a frame memory that stores the combined video signal for one frame.

7. The video processing apparatus according to claim 1, wherein the control unit controls the output timing of the combined video signal within a range of one period of a vertical synchronizing frequency of the input video signal synchronized with the combined video signal among the plurality of input video signals.

8. A display device comprising a video processing apparatus, wherein the video processing apparatus includes:

a memory configured to store a program and a plurality of input video signals; and a processor configured to execute the program to implement a combining unit, a synchronizing unit, a predicting unit, and a control unit, wherein:

the combining unit is configured to combine the plurality of input video signals to output a combined video signal, the synchronizing unit is configured to synchronize the combined video signal with one of the plurality of input video signals, the control unit is configured to control an output timing of the combined video signal based on input timings of the plurality of input video signals, and the predicting unit is configured to predict whether an overtaking occurs based on a relation between the input timing of the plurality of input video signals and the output timing of the combined video signal, and wherein when the overtaking is unavoidable for every input video signal of the plurality of input video signals, the control unit controls the output timing of the combined video signal based on input timings of input video signals except for an input video signal having a lowest priority among the plurality of input video signals.

9. A method of controlling a video processing apparatus, the method comprising the steps of:

storing a plurality of input video signals in a memory;

synchronizing one of the plurality of input video signals with a combined video signal obtained by combining the plurality of input video signals;

controlling an output timing of the combined video signal based on input timings of the plurality of input video signals;

predicting whether an overtaking occurs based on a relation between the input timing of the plurality of input video signals and the output timing of the combined video signal; and outputting the combined video signal, and wherein when the overtaking is unavoidable for every input video signal of the plurality of input video signals, the output timing of the combined video signal is controlled based on input timings of input video signals except for an input video signal having a lowest priority among the plurality of input video signals.

10. A non-transitory computer-readable storage medium storing a program that causes a computer to perform a process to control a video processing apparatus, the process comprising the steps of:

storing a plurality of input video signals in a memory;

synchronizing one of the plurality of input video signals with a combined video signal obtained by combining the plurality of input video signals;

controlling an output timing of the combined video signal based on input timings of the plurality of input video signals;

predicting whether an overtaking occurs based on a relation between the input timing of the plurality of input video signals and the output timing of the combined video signal; and outputting the combined video signal, and wherein when the overtaking is unavoidable for every input video signal of the plurality of input video signals, the output timing of the combined video signal is controlled based on input timings of input video signals except for an input video signal having a lowest priority among the plurality of input video signals.

* * * * *